(12) United States Patent
Witt et al.

(10) Patent No.: US 6,597,844 B1
(45) Date of Patent: Jul. 22, 2003

(54) LOOSE TUBE CABLE HAVING AN EASILY REMOVABLE BUFFER TUBE BINDER FOR CABLE ACCESS

(75) Inventors: Geoffrey Martin Witt, Hickory, NC (US); George Dallas, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/750,338

(22) Filed: Dec. 29, 2000

(51) Int. Cl.[7] ................................................. G02B 6/44
(52) U.S. Cl. ....................................... 385/109; 385/110
(58) Field of Search ....................... 385/100, 109–110, 385/112–113

(56) References Cited

U.S. PATENT DOCUMENTS

| | | | |
|---|---|---|---|
| 4,770,490 A | * 9/1988 | Gruenewald et al. | 385/100 |
| 5,173,961 A | 12/1992 | Chiasson | 385/113 |
| 5,268,971 A | 12/1993 | Nilsson et al. | 385/101 |
| 5,268,983 A | 12/1993 | Tatarka et al. | 385/106 |
| 5,542,020 A | 7/1996 | Horska | 385/112 |
| 5,544,270 A | 8/1996 | Clark et al. | 385/101 |
| 5,905,834 A | * 5/1999 | Anderson et al. | 385/111 |
| 5,970,196 A | * 10/1999 | Greveling et al. | 385/114 |
| 6,088,499 A | * 7/2000 | Newton et al. | 385/112 |

* cited by examiner

*Primary Examiner*—Robert H. Kim
*Assistant Examiner*—Therese Barber
(74) *Attorney, Agent, or Firm*—Sughrue Mion, PLLC

(57) ABSTRACT

An optical fiber cable comprising a plurality of buffer tubes, binder wrapped around the buffer tubes, a ripcord disposed between the buffer tubes and the binder, and a protective outer jacket covering the buffer tubes. Upon application of a sufficient outwardly directed pulling force, the ripcord rips both the binder and the jacket thereby providing access the buffer tubes and optical fibers therein. The binder is formed of a material which melts or softens when the jacket is formed by an extrusion process so that the binder is thereby incorporated into the jacket. Alternatively, the binder is formed of a material which will adhere to the jacket when the jacket is formed by an extrusion process and is easily torn when the jacket is ripped by the ripcord.

22 Claims, 3 Drawing Sheets

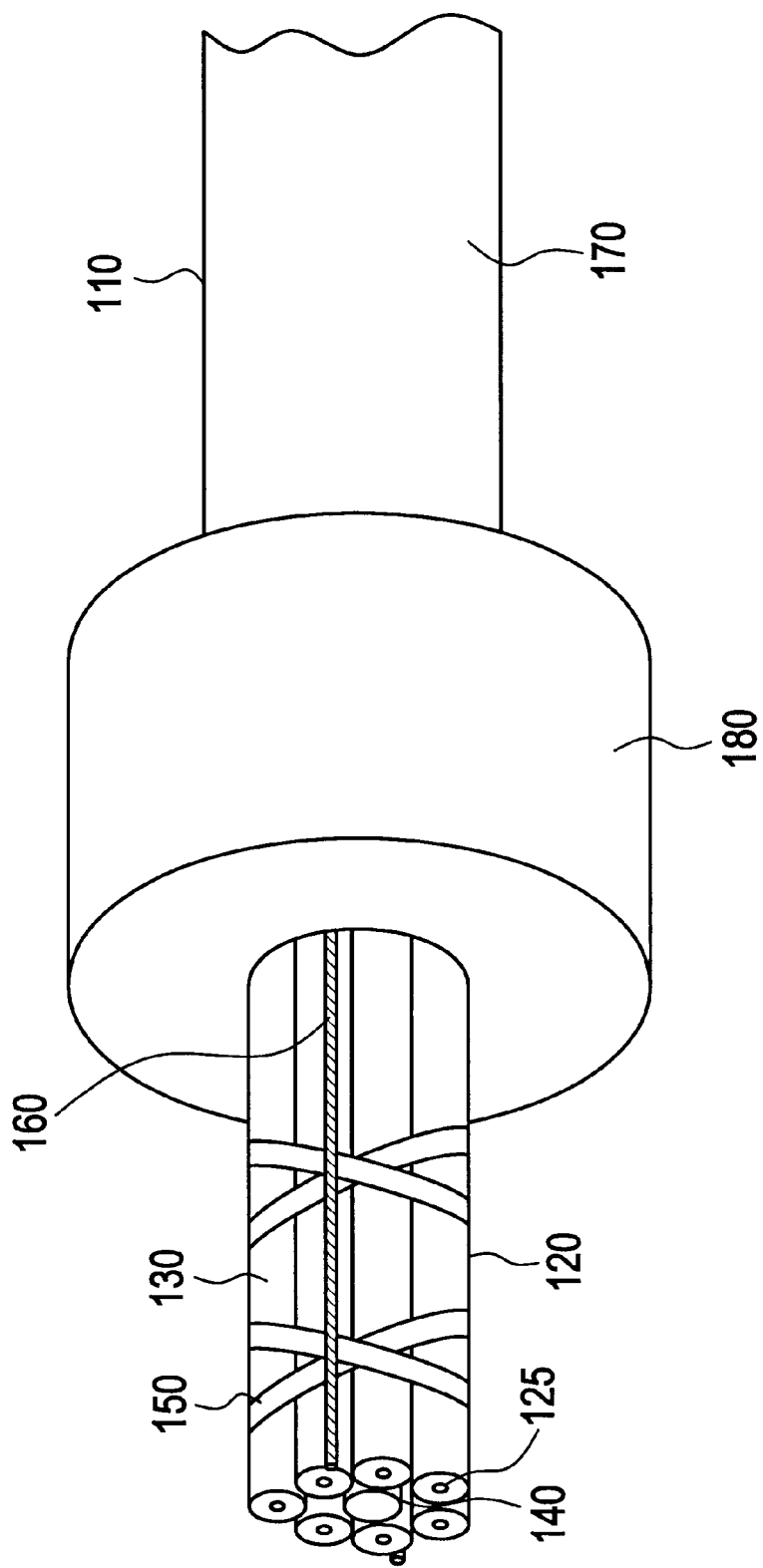

LOOSE TUBE CABLE HAVING AN EASILY REMOVABLE BUFFER TUBE BINDER FOR CABLE ACCESS

FIELD OF THE INVENTION

The present invention relates to a loose tube cable having a binder which is easily removable when the cable is accessed. In particular, the present invention relates to a loose tube cable having ripcord disposed under a binder surrounding a plurality of buffer tubes for ripping a binder and an outer protective jacket. This invention also relates to a binder formed of a material which is weakened or melted by the application of heat when the loose tube cable is jacketed.

BACKGROUND OF THE INVENTION

In conventional loose tube cables, buffer tubes are stranded (helically or reverse helically) around a central strength member to form a stranded core. The buffer tubes are utilized as the primary structure for protecting the thin optical fibers contained within. That is, the buffer tubes house an optical unit such one or more loose optical fibers or an optical fiber ribbon comprising a plurality of optical fibers which are held together in a planar array. The buffer tubes are generally filled with a water blocking component such as a thixotropic gel which prevents water ingress but allows for fiber movement during cable expansion or contraction, or contain a water swellable material which absorbs water. In addition to the buffer tubes, filler rods may be stranded around the central strength member in order to provide symmetry in design for fiber counts lower than that of a full fiber count cable.

After the buffer tubes (and filler rods) are stranded around the central strength member, one or more binders are wrapped around the buffer tubes in order to hold the buffer tubes in place prior to extrusion of a cable jacketing material about the stranded core. The binders are typically tape-like members or filaments made of polyester and aramide materials and may be helically or contra-helically applied. Next, the stranded core which is held together by the binder is wound on a reel at the end of the stranding line and moved to a jacket line where one or more ripcords (typically two ripcords which are 180 degrees apart) are disposed over the stranded core and a plastic material, e.g., polyvinyl chloride (PVC), polyethelene, polypropolyene, or copolymer thereof, is extruded to form a protective outer jacket around the ripcord and stranded core. Once the cable has been jacketed, the binders surrounding the buffer tubes are no longer necessary because the jacket now serves hold the loose tubes in place.

The ripcords disposed between the outer jacket and the stranded core are provided for ripping the outer jacket in order to access the buffer tubes in the loose tube cable. That is, when it is necessary to access the optical fibers in the loose tube cable, e.g., prepare the optical fibers for splicing, the ripcord is pulled with sufficient force to rip the outer jacket and the binders are removed from the buffer tubes using a cutting tool. However, the removal of the binders increases the time required for accessing the cable and may potentially damage the buffer tubes or other cable components.

U.S. Pat. No. 6,088,499 discloses a fiber optic cable which includes a cable core and a sheath section disposed over the cable core. The cable core includes a plurality of buffer tubes housing a plurality of optical fibers, a binder stranded around the cable core, and a ripcord disposed under the binder. The sheath section includes two ripcords, armor tape which surrounds the ripcords, and a jacket which surrounds the armor tape. When it is desired to access the fiber optic cable, the ripcords in the sheath section are pulled to rip the armor tape and the jacket to gain access to the cable core, and then the ripcord in the cable core is pulled to rip the binder to gain access to buffer tubes and the optical fibers therein. However, the additional ripcord in the cable core increases manufacturing costs and is a required step which must be performed in order to access the cable.

In view of the disadvantages of conventional loose tube cables which utilize binders which must be removed in order to access the buffer tubes and optical fibers therein, it is an object of the present invention to provide a solution to the problem of removing binders from fiber optic cables.

SUMMARY OF THE INVENTION

The present invention is adapted to achieve the foregoing objects. In accomplishing these objects, a first embodiment of the present invention provides an optical fiber cable comprising a plurality of buffer tubes, binder wrapped around the buffer tubes, a ripcord disposed between the buffer tubes and the binder, and a protective outer jacket covering the buffer tubes. Upon application of a sufficient outwardly directed pulling force, the ripcord rips both the binder and the jacket thereby providing access the buffer tubes and optical fibers therein.

According to a second embodiment of the present invention, there is provide a fiber optic cable comprising a plurality of buffer tubes, binder wrapped around the buffer tubes, a ripcord, and a protective outer jacket covering the buffer tubes, wherein the binder is formed of a material which melts or softens when the jacket is formed by an extrusion process so that the binder is thereby incorporated into the jacket.

According to a third embodiment of the present invention, there is provided a fiber optic cable comprising a plurality of buffer tubes, binder wrapped around the buffer tubes, a ripcord, and a protective outer jacket covering the buffer tubes, wherein the binder is formed of a material which will adhere to the jacket when the jacket is formed by an extrusion process and is easily torn when the jacket is ripped by the ripcord.

According to a fourth embodiment of the present invention, there is provided a fiber optic cable comprising a plurality of buffer tubes, binder wrapped around the buffer tubes, a ripcord, and a protective outer jacket covering the buffer tubes, wherein the binder is formed of a material which will adhere to the jacket and has mechanical properties which will be reduced when the jacket is formed by an extrusion process, and is easily torn when the jacket is ripped by the ripcord.

The above and other features of the invention including various and novel details of construction and process steps will now be more particularly described with reference to the accompanying drawings and pointed out in the claims. It will be understood that the particular optical fiber cable embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

These and other features, aspects and advantages of the present invention will become better understood with refer

FIG. 3 illustrates a plan view of the fiber optic cable in accordance with a second through fourth embodiments of the present invention.

DESCRIPTION OF THE PREFERRED EMBODIMENTS

Figure 1:
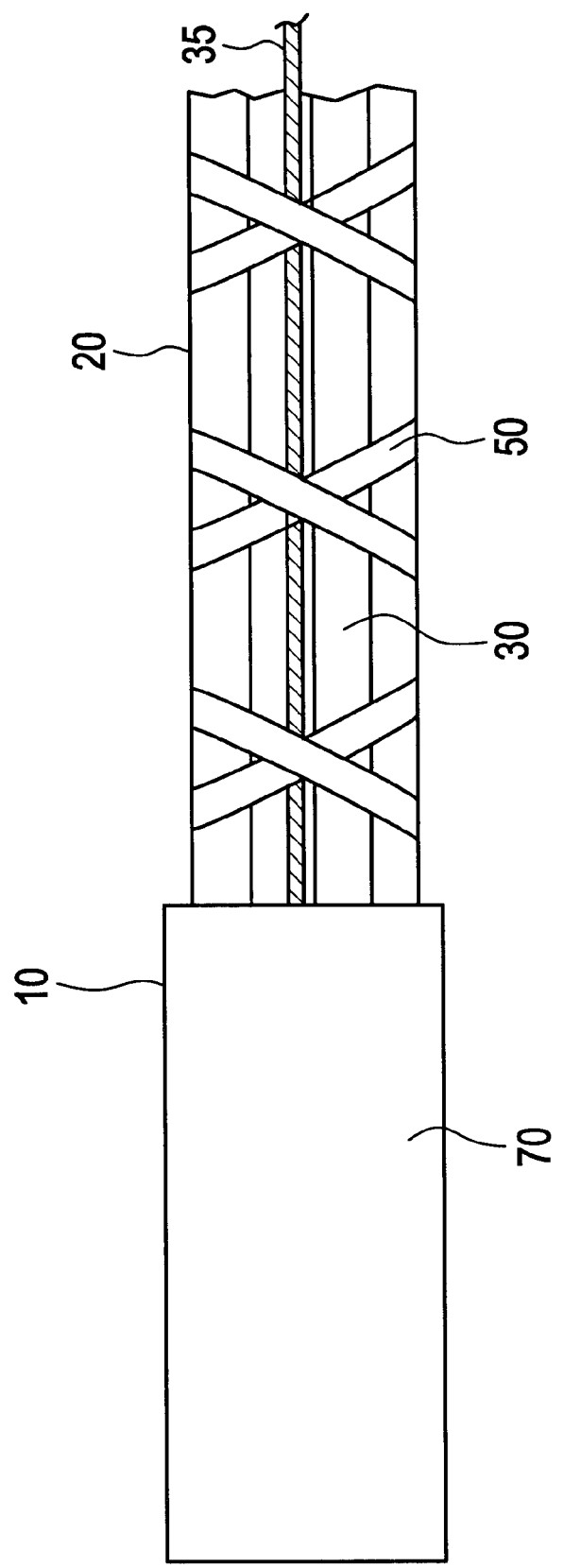
- FIG. 1 illustrates a plan view of the fiber optic cable in accordance with a first embodiment of the present invention.
Figure 2:
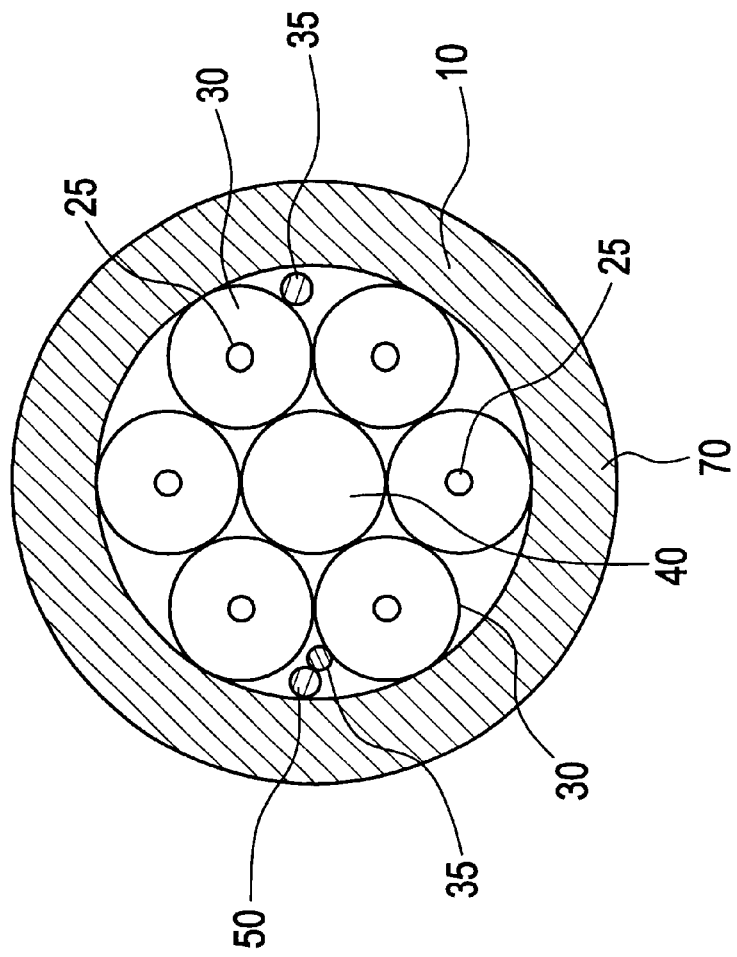
FIG. 2 illustrates a sectional view of the fiber optic cable in accordance with a first embodiment of the present invention.

Referring to FIGS. 1 and 2, a fiber optic cable 10 according to a first embodiment of the present invention will be described. The fiber optic cable 10 includes a core section 20 formed by stranding a plurality of buffer tubes 30 around a central strength member 40. Each of the buffer tubes 30 includes one or more loose optical fibers 25 or an optical fiber ribbon (not shown) comprising a plurality of optical fibers which are held together in a planar array. Further, each of the buffer tubes 30 is filled with a water blocking component such as a thixotropic gel which prevents water ingress, or contains a water swellable material which absorbs water. In addition to the buffer tubes 30, filler rods (not shown) may be stranded around the central strength member 40 in order to provide symmetry in design for fiber counts lower than that of a full fiber count cable.

One or more ripcords 35 are disposed lengthwise along on the core section 20 and a binder 50 is wrapped or stranded around the core section 20 and the ripcords 35 to hold the stranded buffer tubes 30 prior to jacketing. During the jacketing operation, the core section 20 is passed through an extruder head (not shown) to cover the core section 20 with an outer protective jacket 70 which surrounds the core section 20 thereby producing the jacketed fiber optic cable. The ripcords 35 are operative to rip both the binder 50 and the jacket 70 upon application of a sufficient outwardly directed pulling force. In the preferred embodiment, two ripcords 35 are arranged on opposite sides (i.e., 180 degrees apart) of the core section 20 so that the cable is perfectly bisected when the ripcords are pulled. Examples of materials that can be used as binders include paper which is textured or coated with an adhesive such as ethylene or propylenne copolymer adhesive, mylar foil, metal foils (e.g., copper, aluminum or steel), polymer tapes (e.g., polyester or polyolefin), elastomeric tapes (e.g., polyolefn, acrylic, or polyurethane), cloth tapes (e.g., cotton, polyester, nylon, linen). In addition, the binder 50 may be have optimized mechanical properties such as slits along the edge to initiate a tear. The ripcord 35 can be made of polyester, aramid, glass, carbon fiber or blends of the materials. The jacket material can be made from polyethylene, polypropylene or copolymers of the two materials.

Referring to FIG. 3, a fiber optic cable 110 according to a second embodiment of the present invention will be described. The fiber optic cable 10 includes a core section 120 formed by stranding a plurality of buffer tubes 130 around a central strength member 140. Each buffer tube 130 includes one or more loose optical fibers 125 or an optical fiber ribbon comprising a plurality of optical fibers which are held together in a planar array. Further, each of the buffer tubes 130 is filled with a water blocking component such as a thixotropic gel which prevents water ingress, or contains a water swellable material which absorbs water.

A binder 150 is wrapped or stranded around the core section 120 to hold the stranded buffer tubes 130 in place so that an outer protective jacket 170 may be applied which surrounds the core section 120 and binder 150. As shown in FIG. 3, in the jacketing operation, one or more ripcords 160 are placed over the binder 150, and the core section 120 and the ripcords 160 are passed through an extruder head 180 to cover the core section 120 and ripcords 160 with the outer protective jacket 170 thereby producing the jacketed fiber optic cable. Alternatively, the ripcords 160 may be placed under the binder 150 prior to extrusion of the outer protective jacket 170, as in the first embodiment of the present invention.

In accordance with the second embodiment of the present invention, the binder 150 is formed of a material, such as polypropylene, polyethylene, and copolymers thereof, which will melt when the jacket 170 is extruded from the extruder 180 so that the binder 150 will be absorbed or incorporated into the jacket 170. That is, the binder 150 is formed of a material having a melting temperature which is less than temperature of an extruder (e.g., less than 450 degrees Fahrenheit) which extrudes the jacket 170. The melting temperature of the binder is less than the temperature of the molten jacket as it is applied to the core section.

In accordance with a third embodiment of the present invention, the binder 150, as discussed above with regards to the second embodiment, may be formed of a material which adheres to the jacket 170 when the core section 120 is covered with the outer protective jacket extruded from the extruder head 180, and is easily torn or ripped when the jacket 170 is removed via the ripcords 160. Alternatively, where an armor layer (not shown) is provided between the jacket 170 and the binder 150, the binder will adhere to the armor layer. Examples of materials which will adhere to the jacket 170 or armor layer include paper which is textured or coated with an adhesive such as ethylene or propylene copolymer adhesive, mylar foil, metal foils (e.g., copper, aluminum or steel), polymer tapes (e.g., polyester or polyolifin), elastomeric tapes (e.g., polyolifin, acrylic, or polyurathane), cloth tapes wherein texture allows adhesion to the jacket 170 (e.g., cotton, polyester, nylon, linen).

In accordance with a fourth embodiment of the present invention, the binder 150, as discussed above with regards to the second and third embodiments, may be formed of a material having mechanical properties that are reduced with heat, causing the material to soften and adhere to the jacket when the jacket is extruded to cover the core section 120 so that the binder 150 is easily tom or ripped when the jacket is removed via the ripcords 160. Alternatively, where an armor layer (not shown) is provided between the jacket 170 and the binder 150, the binder will adhere to the armor layer. Examples of materials include thermoplastic elastomers (crosslinked), polyolifins such as propylene, ethylene and their copolymers, and polymers with weak thermal linkages such as polyether linkages.

As in the second embodiment, the ripcords 160 in the third and fourth embodiements may be placed over the binder 150 or under the binder 150 prior to extrusion of the outer protective jacket 170.

As discussed above, the binder materials of the second embodiment will work with non-armored cables, where the binder materials will contact the jacket. The binder materials of the third and fourth embodiments work with both armored and non-armored cables. However, with armored cables, the binders must adhere to the armor layer, by using an adhesive, by softening the binder, or by softening the coating on the armor (r.f. heating).

Accordingly, the fiber optic cable in accordance with the first though fourth embodiments of the present invention eliminate the need for cutting tools for cutting the binder, or multiple different ripcords for ripping the binder and the jacket thereby reducing the time required for accessing the cable as well as the manufacturing cost.

Although certain preferred embodiments of the present invention have been described, the spirit and scope of the invention is by no means restricted to what is described above. For example, although the preferred embodiment as been described with reference to binders for a loose tube cable, the ripcord and binder materials utilized in the different embodiments of the present invention can be adapted for use for binders stranded around other cable components.

What is claimed is:

1. An optical fiber cable, comprising:
    a plurality of buffer tubes having optical fibers therein;
    a binder stranded around said buffer tubes to hold said buffer tubes together;
    a first ripcord disposed between said buffer tubes and said binder; and
    a jacket circumscribing said buffer tubes, said binder and said ripcord, wherein said ripcord rips said binder and said jacket upon application of an outwardly directed pulling force.

2. The optical fiber cable according to claim 1, further comprising a second ripcord disposed between said buffer tubes and said binder, wherein said first and second ripcords are arranged on opposite sides of said buffer tubes held together by said binder.

3. The optical fiber cable according to claim 1, wherein said binder is made of paper, mylar foil, metal foil, or polymer tape.

4. The optical fiber cable according to claim 1, wherein said first ripcord is made of aramid, glass, or carbon fibers.

5. An optical fiber cable, comprising:
    a plurality of buffer tubes having optical fibers therein;
    a binder wrapped around said buffer tubes to hold said buffer tubes together;
    a jacket circumscribing said buffer tubes, wherein said binder is incorporated into said jacket and is formed of a material which melts upon application of heat when said jacket is formed by an extrusion process; and
    a ripcord disposed between said buffer tubes and said jacket, wherein said ripcord rips said jacket and said binder upon the application of an outwardly directed pulling force.

6. The optical fiber cable according to claim 5, wherein said material of said binder comprises polypropylene, polyethylene or copolymers thereof.

7. The optical fiber cable according to claim 5, wherein said ripcord is disposed between said buffer tubes and said binder.

8. An optical fiber cable, comprising:
    a plurality of buffer tubes having optical fibers therein;
    a binder wrapped around said buffer tubes to hold said buffer tubes together;
    a jacket circumscribing said buffer tubes, wherein said binder is formed of a material which is textured or coated with adhesive so that said binder adheres to said jacket when said jacket is formed by an extrusion process; and
    a ripcord disposed between said buffer tubes and said jacket, wherein said ripcord rips said jacket and said binder upon the application of an outwardly directed pulling force.

9. The optical fiber cable according to claim 8, wherein said ripcord is disposed between said buffer tubes and said binder.

10. The optical fiber cable according to claim 8, wherein said material comprises paper which is textured or coated with an adhesive, mylar foil, polymer tape, elastomeric tape, or cloth tapes wherein texture allows adhesion to jacket.

11. An optical fiber cable, comprising:
    a plurality of buffer tubes having optical fibers therein;
    a binder wrapped around said buffer tubes to hold said buffer tubes together;
    an armor layer circumscribing said buffer tubes;
    a jacket circumscribing said armor layer, wherein said binder is formed of a material which is textured or coated with adhesive so that said binder adheres to said armor layer when said jacket is formed by an extrusion process; and
    a ripcord disposed between said buffer tubes and said armor layer, wherein said ripcord rips said jacket, said armor layer and said binder upon the application of an outwardly directed pulling force.

12. The optical fiber cable according to claim 11, ripcord is disposed between said buffer tubes and said binder.

13. The optical fiber according to claim 11, wherein said material comprises paper which is textured or coated with an adhesive, mylar foil, metal foil, polymer tape, elastomeric tape, or cloth tapes wherein texture allows adhesion to the jacket.

14. An optical fiber cable, comprising:
    a plurality of buffer tubes having optical fibers therein;
    a binder wrapped around said buffer tubes to hold said buffer tubes together;
    a jacket circumscribing said buffer tubes, wherein the tensile strength of said binder is permanently reduced after application of heat when said jacket is formed by an extrusion process; and
    a ripcord disposed between said buffer tubes and said jacket, wherein said ripcord rips said jacket and said binder upon the application of an outwardly directed pulling force.

15. The optical fiber cable according to claim 14, wherein said binder is formed of a material which adheres to said jacket when said jacket is formed by the extrusion process.

16. The optical fiber cable according to claim 15, wherein said material comprises a thermoplastic elastomer, polyolifin, or polymers with weak thermal linkages.

17. The optical fiber cable according to claim 15, wherein said ripcord is disposed between said buffer tubes and said binder.

18. An optical fiber cable, comprising:
    a plurality of buffer tubes having optical fibers therein;
    a binder wrapped around said buffer tubes to hold said buffer tubes together; and
    an armor layer circumscribing said buffer tubes,
    a jacket circumscribing said armor layer, wherein the tensile strength of said binder is permanently reduced after application of heat when said jacket is formed by an extrusion process; and
    a ripcord disposed between said buffer tubes and said armor layer, wherein said ripcord rips said jacket, said armor layer and said binder upon the application of an outwardly directed pulling force.

19. The optical fiber cable according to claim 18, wherein said binder is formed of a material which adheres to said armor layer when said jacket is formed by the extrusion process.

20. The optical fiber cable according to claim 19, wherein said material comprises a thermoplastic elastomer, polyolifin, or polymers with weak thermal linkages.

21. The optical fiber cable according to claim 19, wherein said ripcord is disposed between said buffer tubes and said binder.

22. An optical fiber cable, comprising:
- a plurality of buffer tubes having optical fibers therein;
- a binder wrapped around said buffer tubes to hold said buffer tubes together; and
- a jacket circumscribing said buffer tubes and melting at an extrusion temperature, wherein said binder is formed of a material which melts at a temperature less than or equal to said extrusion temperature so that said binder is incorporated into said jacket when said jacket is formed by an extrusion process.

\* \* \* \* \*